(12) United States Patent
Chifu et al.

(10) Patent No.: US 9,500,935 B2
(45) Date of Patent: Nov. 22, 2016

(54) PROJECTION IMAGE DISPLAY DEVICE

(75) Inventors: Hiroko Chifu, Tokyo (JP); Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 360 days.

(21) Appl. No.: 14/112,528

(22) PCT Filed: Apr. 18, 2011

(86) PCT No.: PCT/JP2011/059523
§ 371 (c)(1),
(2), (4) Date: Oct. 17, 2013

(87) PCT Pub. No.: WO2012/143990
PCT Pub. Date: Oct. 26, 2012

(65) Prior Publication Data
US 2014/0043589 A1 Feb. 13, 2014

(51) Int. Cl.
*G03B 21/14* (2006.01)
*G03B 21/20* (2006.01)
(Continued)

(52) U.S. Cl.
CPC .......... *G03B 21/142* (2013.01); *G02B 26/008* (2013.01); *G02B 27/102* (2013.01);
(Continued)

(58) Field of Classification Search
CPC G03B 21/14; G03B 21/208; G03B 21/2013; G03B 21/204; G02B 27/102; G02B 27/48
USPC ............ 353/31, 33, 37, 84, 85; 362/84, 231, 362/235
See application file for complete search history.

(56) References Cited

U.S. PATENT DOCUMENTS 8,469,520 B2 * 6/2013 Maeda ............... G03B 21/2033
349/9
8,833,946 B2 * 9/2014 Chen .................... H04N 9/3161
353/84

(Continued)

FOREIGN PATENT DOCUMENTS

JP 07-297111 A 11/1995
JP 11-064789 A 3/1999
(Continued)

OTHER PUBLICATIONS

United States Office Action dated Jul. 8, 2015 in co-pending U.S. Appl. No. 14/129,235.

(Continued)

*Primary Examiner* — William C Dowling
(74) *Attorney, Agent, or Firm* — McGinn IP Law Group, PLLC

(57) ABSTRACT

A projection image display device includes: a laser light source; phosphor excited by excitation laser light emitted from laser light source to emit light; an optical functional reflector (cross dichroic prism) into which at least one laser light from laser light source and fluorescent light from phosphor enters and which reflects light of a specific wavelength band while transmitting light of the other wavelength band; a diffusion plate that diffuses the laser light; a diffusion plate driver for moving the diffusion plate; and a spatial light modulation element (digital micromirror device) that modulates the light output from cross dichroic prism. Diffusion plate is disposed on the optical path of excitation laser light applied from laser light source to phosphor.

15 Claims, 9 Drawing Sheets

(51) Int. Cl.
- *H04N 9/31* (2006.01)
- *G02B 27/48* (2006.01)
- *G02B 26/00* (2006.01)
- *G02B 27/10* (2006.01)

(52) U.S. Cl.
CPC .......... *G02B 27/48* (2013.01); *G03B 21/204* (2013.01); *G03B 21/208* (2013.01); *H04N 9/3144* (2013.01); *H04N 9/3161* (2013.01); *G02B 2207/113* (2013.01)

(56) References Cited

U.S. PATENT DOCUMENTS

| | | | |
|---|---|---|---|
| 8,979,278 B2 * | 3/2015 | Narikawa | G03B 21/204 353/85 |
| 8,998,421 B2 | 4/2015 | Akiyama et al. | |
| 2003/0039036 A1 * | 2/2003 | Kruschwitz | G02B 27/0927 359/707 |
| 2010/0328632 A1 * | 12/2010 | Kurosaki | G03B 21/204 353/98 |
| 2011/0051102 A1 * | 3/2011 | Ogura | G03B 21/14 353/85 |
| 2013/0010264 A1 * | 1/2013 | Takahashi | H04N 9/3114 353/20 |
| 2013/0194552 A1 * | 8/2013 | Matsubara | G03B 21/2013 353/31 |
| 2013/0215397 A1 * | 8/2013 | Matsubara | G03B 21/204 353/57 |
| 2013/0222772 A1 * | 8/2013 | Matsubara | G03B 21/204 353/31 |
| 2013/0286359 A1 * | 10/2013 | Motoya | G03B 21/204 353/31 |
| 2014/0028984 A1 * | 1/2014 | Osaka | G03B 21/2013 353/31 |
| 2014/0071182 A1 | 3/2014 | Takahashi | |
| 2014/0125956 A1 * | 5/2014 | Chifu | G02B 27/48 353/31 |
| 2014/0139810 A1 | 5/2014 | Matsubara | |

FOREIGN PATENT DOCUMENTS

| | | |
|---|---|---|
| JP | 2003-098476 A | 4/2003 |
| JP | 2010-237443 A | 10/2010 |
| JP | 2011-013320 A | 1/2011 |
| WO | WO 2005/008330 A1 | 1/2005 |
| WO | WO 2009/118902 A1 | 10/2009 |

OTHER PUBLICATIONS

United States Notice of Allowance dated Oct. 29, 2015 in co-pending U.S. Appl. No. 14/129,235.

International Search Report (ISR) (PCT Form PCT/ISA/210), in PCT/JP2011/059523, dated May 17, 2011.

* cited by examiner (a)

(b)

(a)

(b)

(a)

(b)

(a)

(b)

PROJECTION IMAGE DISPLAY DEVICE

TECHNICAL FIELD

The present invention relates to a projection image display device that uses laser light and fluorescent light.

BACKGROUND ART

The projection image display device (projector device) that enlarges and displays an image is widely used for purposes from personal theater to business presentations. An ultrahigh pressure mercury lamp is mainly used as a light source for such a projector device. However, there are problems of a short life of light source, environmental loads imposed by mercury use, and the like. The ultrahigh pressure mercury lamp is not the best light source for projector device that are becoming increasingly miniaturized. This is because optical systems become complex due to the separation of white light into three primary colors and because it is difficult to design a compact optical engine due to large etendue.

To solve these problems, development of a projector device that includes a semiconductor laser as a light source has been pursued. A laser light source has the characteristics of high light use efficiency because of high directionality, low power consumption, and a long life.

Further, there has been offered a method to obtain light that has the required color by causing a phosphor to emit light by using the blue light or the ultraviolet light of the semiconductor laser as excitation light.

Patent Document 1 (JP2010-237443A) offers a configuration where a circular substrate attached to a wheel motor is divided into a region coated with a phosphor for emitting red fluorescent light, a region coated with a phosphor for emitting green fluorescent light, and a region for transmitting blue laser light. With this configuration, by applying excitation light to the specific position of the substrate while rotating the wheel motor, red fluorescent light, green fluorescent light, and blue laser light can be generated in time division to be used as light sources for the projector device. Further, the configuration simultaneously provides the effect of preventing thermal damage to the phosphor by rotating the substrate coated with the phosphor by the wheel motor to disperse the energy of excitation laser condensed on the phosphor. Such a hybrid light source combining a semiconductor laser with the phosphor is expected to become the light source of the high-output and compact projector device.

In the projector device that uses the laser light, speckle noise is a problem. As a general method for reducing the speckle noise, there are two approaches, namely, incoherent conversion of the laser light and reduction of apparent speckle noise.

The former is a method for converting the laser light into incoherent light (incoherency) by eliminating coherency of the laser light, which is performed by broadening the wavelength width by high-frequency superimposition, multiplexing laser light having a delay longer than a coherent distance, or superimposing orthogonal polarized lights. This method is essentially designed to prevent generation of speckles by changing the nature of light itself. Thus, the semiconductor laser itself or a driving circuit must be directly revised, or the optical system must be greatly changed. In many cases, the method is compositely combined with other methods to be used because it is difficult to obtain satisfactory effects alone.

The latter is a method for reducing apparent speckle noise by superimposing the speckle patterns of an image a plurality of times to integrate them within time (less than 20 ms) where the patterns are discernible to the human eye, and then by averaging speckle noise to a level to be ignored by the human eyes, which is performed by swinging the screen or vibrating an optical component. This method does not essentially change the nature of light. Accordingly, though generated, speckles cannot be recognized by the human eyes due to optical illusion. With this method, effects are conspicuous due to optical illusion. However, the screen swinging is applied only to a part of a rear projectors or the like because it necessitates a big structure and imposes restrictions on the screen.

Patent Document 2 (JP11-064789A) discloses a method for reducing speckle noise by causing an optical component to vibrate. FIGS. 1a-1b are perspective views schematically showing a configuration for reducing speckle noise: FIG. 1a showing a first related art, and FIG. 1b showing a second related art. In the general projector device, laser light from laser light source 2 is converted into parallel light by collimator lens 3, and transmitted through various optical components including light integrator 9b, a condenser lens 12a, or the like to enter into spatial light modulation element 10a. Then, light modulation is performed at spatial light modulation element 10a according to an image signal, and subsequently enlarged and projected to a screen (not shown). With this configuration, in the first related art shown in FIG. 1a, by rotating light integrator 9b including a pair of fly-eye lenses 16c and 16d located between a combination of laser light source 2 with collimator lens 3 and a combination of condenser lens 12a with spatial light modulation element 10a, around the optical axis, the speckle pattern is temporally and spatially moved in the optical system, and speckles formed on the retina are integrated, thereby reducing apparent speckle noise. In the second related art shown in FIG. 1b, by rotating light integrator 9c including rod lens 26a (transparent medium such as glass having rectangular surface) located between a combination of laser light source 2, collimator lens 3, and condenser lens 27a and a combination of condenser lens 12a with spatial light modulation element 10a, around the optical axis, similar effects are obtained.

FIGS. 2a-2b are schematic plan views showing another configuration for reducing speckle noise: FIG. 2a showing a third related art, and FIG. 2b showing a fourth related art. The third and fourth related arts are disclosed in Patent Document 3 (JP7-297111A). In the third related art shown in FIG. 2a, condenser lens 27b and collector lens 29a are arranged on the optical path of laser light, and a dynamic scattering medium (diffusion plate 20f) that is driven by motor 28 to rotate is disposed therebetween. In the fourth related art shown in FIG. 2b, a dynamic scattering medium (diffusion plate 20g) driven by signal source 31 and transducer 30 to vibrate ultrasonically is disposed on an optical path between condenser lens 27c including mirror part 32 and collector lens 29b. With this configuration, a scattering state on the optical path is changed by diffusion plates 20f and 20g to cause the speckle pattern to vibrate temporally and spatially, and speckles formed on the retina are integrated, thereby reducing apparent speckle noise.

FIGS. 3a-3b are schematic plan views showing yet another configuration for reducing speckle noise: FIG. 3a showing a fifth related art, and FIG. 3b showing a sixth related art. The fifth and sixth related arts are disclosed in Patent Document 4 (JP2003-098476A).

In the fifth related art shown in FIG. 3a, diffusion plate 20h is disposed between beam expansion optics 33 including a magnifying lens (collimator lens 3e) and collimator lens 3f and beam forming optics 34 including a pair of fly-eye lenses 16e and 16f and condenser lenses 12c and 12d. Diffusion plate 20h is swung by motion application means 35a. Accordingly, the speckle pattern is vibrated temporally and spatially, and speckles formed on the retina are integrated, thereby reducing apparent speckle noise. On the downstream side of beam forming optics 34, a pair of polarization plates 37 and 38 and polarized beam splitter 36 located therebetween are arranged.

In the sixth related art shown in FIG. 3b, in addition to the aforementioned configuration, diffusion plate 20i is disposed between beam forming optics 34 and spatial light modulation element 10d, and swung by motion application means 35b. By swinging two diffusion plates 20h and 20i by motion application means 35a and 35b, the effect of reducing the speckle noise is improved. Motion application means 35a and 35b can be made common.

FIGS. 4a-4b are schematic plan views showing yet another configuration for reducing speckle noise: FIG. 4a showing a seventh related art, and FIG. 4b showing an eighth related art. The seventh and eighth related arts are disclosed in Patent Document 5 (WO2005/008330A1). In the seventh related art shown in FIG. 4a, as in the case of the aforementioned fifth and sixth related arts, diffusion plate 20j is disposed in the midway of the optical path (in this case, incident side position of spatial light modulation element 10a). Diffusion plate 20j is connected to diffusion plate swinging part 39. Speckle noise is effectively reduced by setting swinging speed V of diffusion plate 20j to V>d×30 with respect to particle size d of diffusion plate 20j. Further, the diffusion angle of diffusion plate 20j is set to be limited with respect to the numerical aperture of an illumination optical system and the brightness of a projection lens. Thus, the light amount loss of laser light by diffusion plate 20j is reduced. In the eighth related art shown in FIG. 4b, a configuration including rod lens 26b as a light integrator in place of the pair of fly-eye lenses 16e and 16f is disclosed.

Because the light condensation of the laser light is high because it has a single wavelength, and light intensity has the gaussian distribution (single mode), so that a local energy density during light condensing is extremely high. Accordingly, when excitation laser light 17a is condensed on phosphor 6, phosphor 6 easily receives thermal damage. In such a case, no fluorescent light is generated, which causes the color of the projected image to deteriorate. When the thermal damage further progresses, circular substrate 7 coated with phosphor 6 is damaged, excitation laser light 17a travels through circular substrate 7, which increases the possibility that a safety problem will occur.

To prevent this, during the operation of projector device 1, circular substrate 7 coated with phosphor 6 is connected to wheel motor 8 to be rotated, and the energy of excitation laser light 17a condensed on phosphor 6 is dispersed, thereby preventing thermal damage to the specific part of phosphor 6.

PRIOR ART DOCUMENTS

Patent Documents

Patent Document 1: JP2010-237443A
Patent Document 2: JP11-064789A
Patent Document 3: JP7-297111A
Patent Document 4: JP2003-098476A
Patent Document 5: WO2005/008330A1

SUMMARY OF INVENTION

Problems to be Solved by Invention

As described above, in the projector device that uses the laser light as the light of a part or all of the three primary colors, to reduce the speckle noise that causes deterioration of image quality, various methods for reducing the apparent speckle noise have been provided such as, for example, by moving the optical member (light integrator or diffusion plate) to integrate and average the spectacle patterns formed on the retina.

However, when the optical member such as the light integrator is rotated around the optical axis, the rotational mechanism of the optical member becomes large, which increases costs, mounting capacity and power consumption.

In the projector device that uses the fluorescent light excited by the laser light as the light of a part or all of the three primary colors, measures are taken to prevent thermal damage to the phosphor by rotating the circular substrate coated with the phosphor by the wheel motor to disperse light energy. However, when the excitation laser light is applied to the phosphor by the condenser optical system to constitute a compact optical engine, even while the phosphor rotates, a problem may occur: specifically, the phosphor receives thermal damage circumferentially depending on the light output of the excitation layer light.

It is therefore an object of the present invention to provide a projection image display device in which there is a small amount of speckle noise and in which thermal damage to the phosphor is limited.

Means to Solve the Problem

A projection image display device includes: a laser light source; a phosphor excited by excitation laser light emitted from at least one laser light source to emit light; an optical functional reflector into which at least one of laser light from the laser light source and fluorescent light from the phosphor enters and which reflects light of a specific wavelength band while transmitting light of the other wavelength band; a diffusion plate that diffuses the laser light; diffusion plate driving means for moving the diffusion plates; and a spatial light modulation element that modulates the light output from the optical functional reflector. The diffusion plate is disposed on the optical path of the excitation laser light applied from the laser light source to the phosphor. The diffusion plate driving means may be configured to vibrate, swing, or rotate the diffusion plate.

Effects of Invention

According to the projection image display device of the present invention, by the diffusion plate located on the optical path of the excitation laser light causes the excitation laser light to become uniform within a beam to reduce the local increase of energy density. Thus, thermal damaging of the phosphor can be easily prevented.

When the diffusion plate is disposed on the optical path of laser light (laser light for light source), except for the excitation laser light, and moved, the speckle noise of the laser light for the light source can be easily reduced.

EXEMPLARY EMBODIMENT

Figure 1:
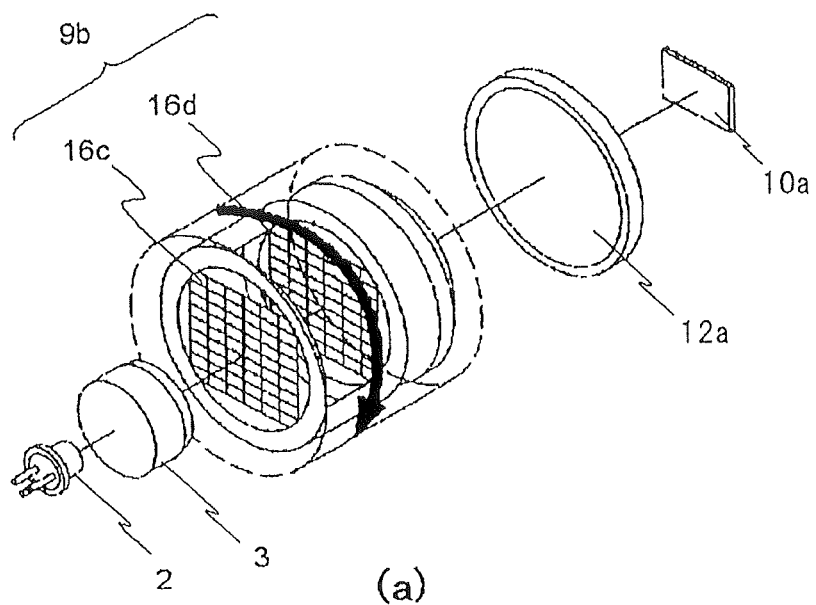
FIG. 1a is a perspective view showing the main portion of the projection image display device of a first related art for reducing speckle noise.
FIG. 1b is a perspective view showing the main portion of the projection image display device of a second related art.
Figure 1:
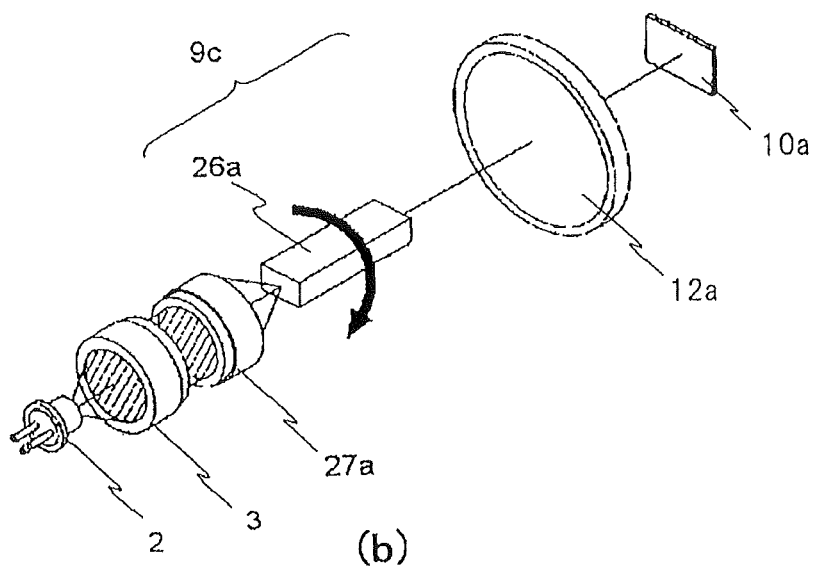
Figure 2:
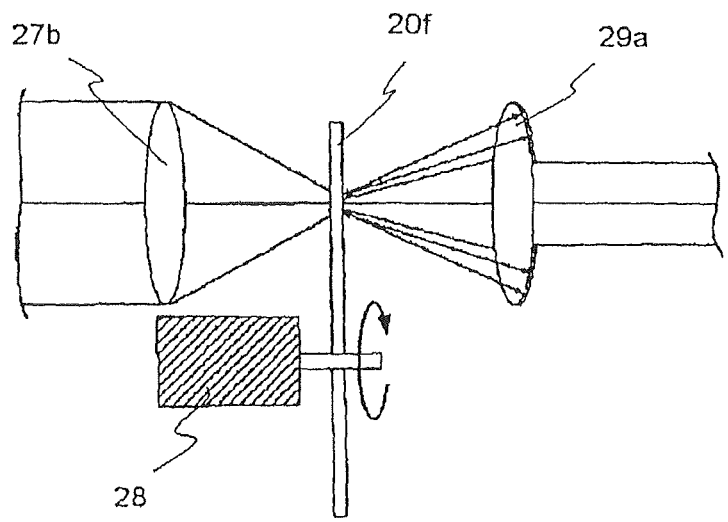
FIG. 2a is a schematic upper view showing the main portion of the projection image display device of a third related art for reducing speckle noise.
FIG. 2b is a schematic upper view showing the main portion of the projection image display device of a fourth related art.
Figure 2:
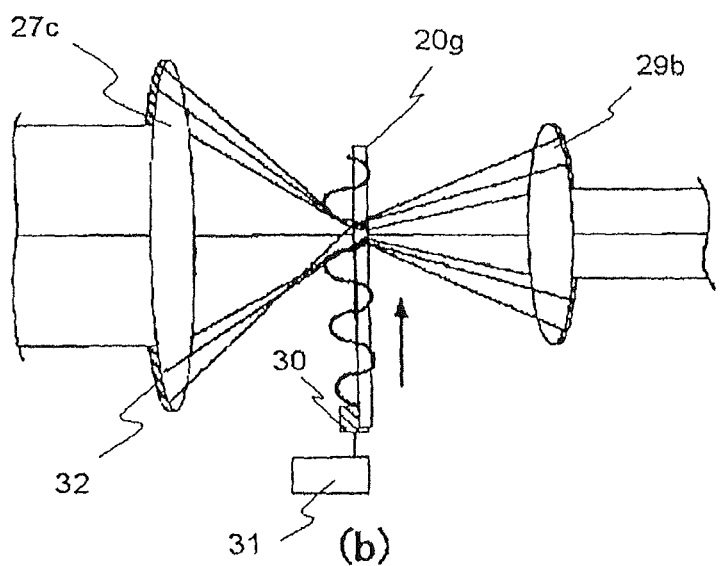
Figure 3:
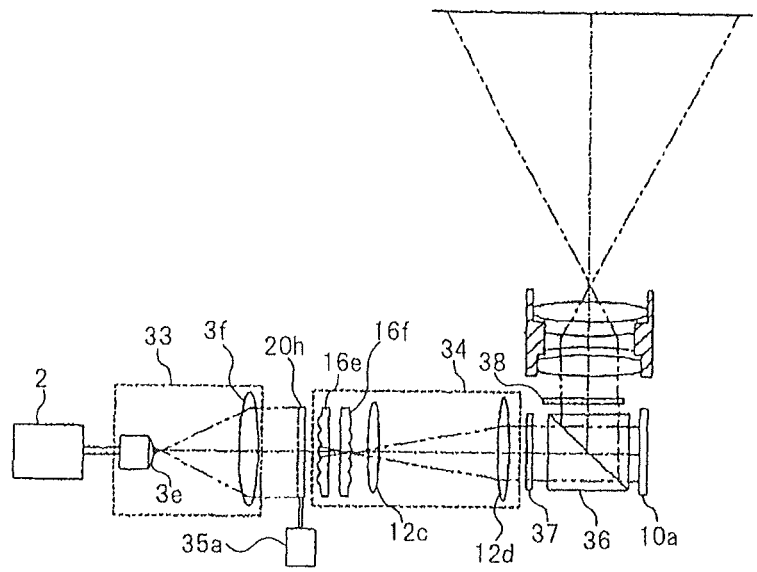
FIG. 3a is a schematic upper view showing the projection image display device of a fifth related art for reducing speckle noise.
FIG. 3b is a schematic upper view showing the projection image display device of a sixth related art.
Figure 3:
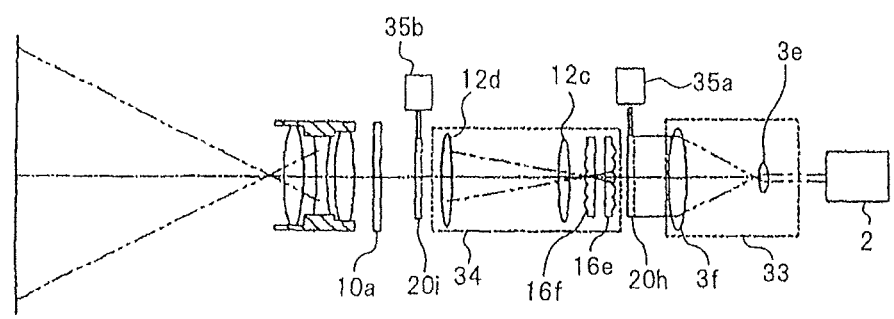
Figure 4:
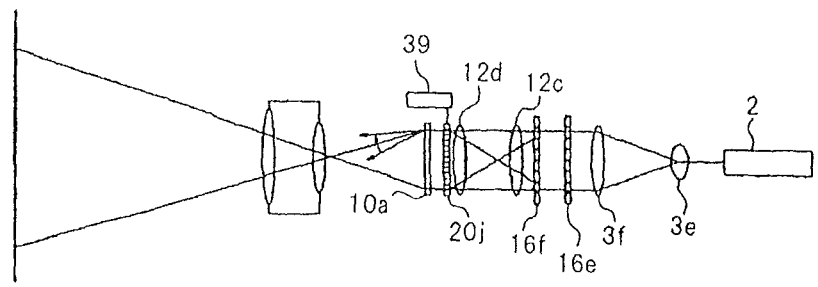
FIG. 4a is a schematic upper view showing the projection image display device of a seventh related art for reducing speckle noise.
FIG. 4b is a schematic upper view showing the projection image display device of an eighth related art.
Figure 4:
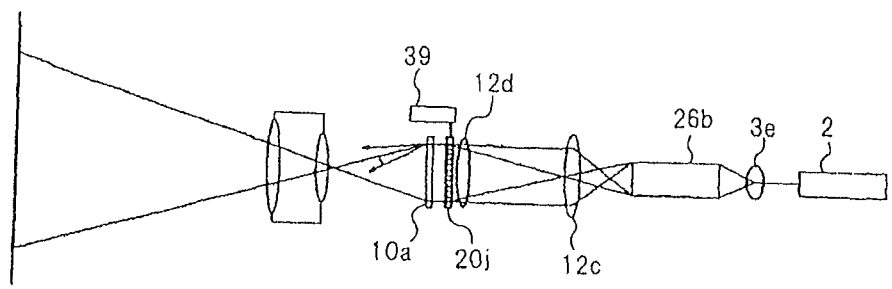
Figure 5A:
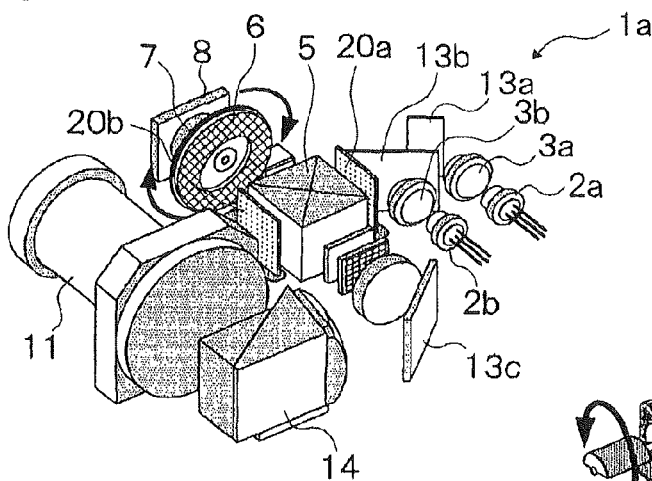
FIG. 5a is a perspective view showing a projection image display device according to the first exemplary embodiment of the present invention.
Figure 5B:
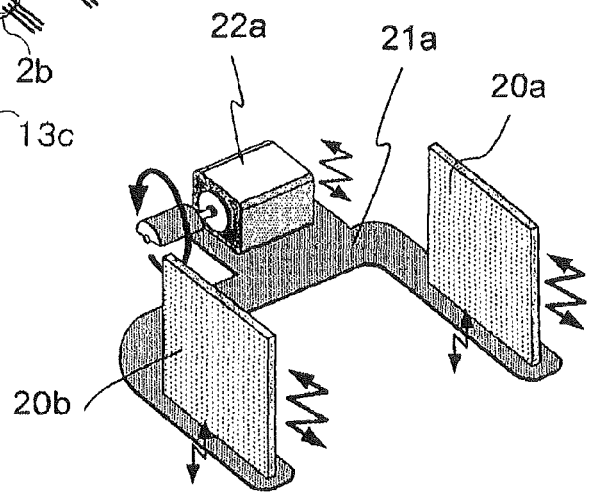
FIG. 5b is an expanded perspective view showing the main portion thereof.
Figure 5C:
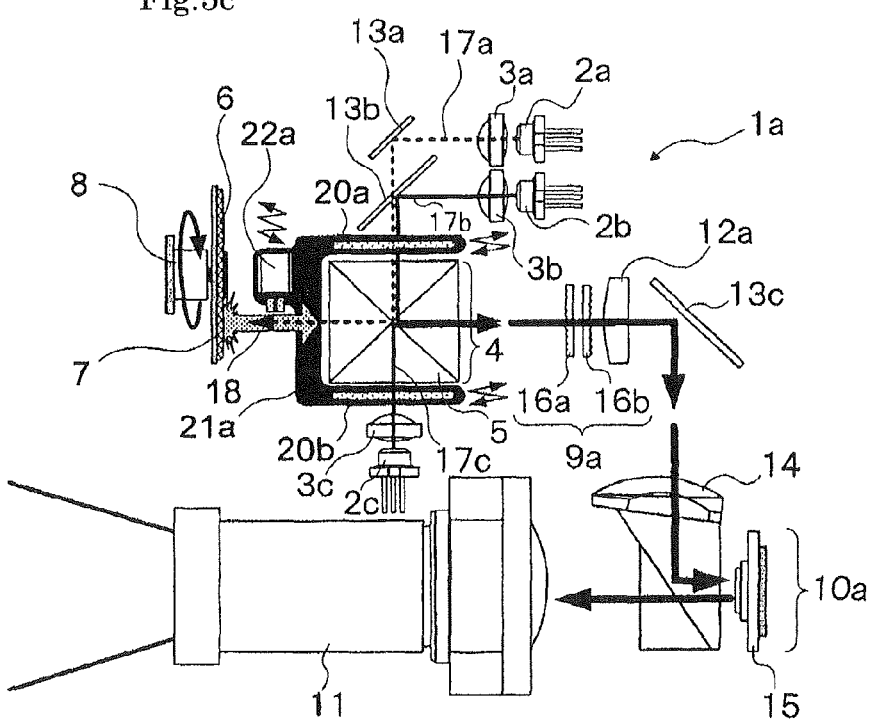
FIG. 5c is a schematic upper view thereof.

Next, the exemplary embodiments of a projection image display device according to the present invention will be described with reference to the drawings. FIGS. 5a-5c show a projection image display device according to the first exemplary embodiment of the present invention: FIG. 5a being a perspective view, FIG. 5b being an expanded perspective view showing the main portion thereof, and FIG. 5c being a schematic upper view.

First, the basic configuration of projection image display device (projector device) 1a shown in FIGS. 5a-5c will be described. Projection image display device 1a mainly includes laser light sources 2a to 2c respectively corresponding to the signals of three primary colors of red, green, and blue, collimator lenses 3a to 3c, cross dichroic prism 5 that is multilayer optical function reflector 4, circular substrate 7 coated with phosphor 6, wheel motor 8 for driving circular substrate 7 to rotate, light integrator 9a for converting the lights of three primary colors (red, green, and blue) combined by cross dichroic prism 5 into a rectangular light flux, spatial light modulation element 10a, and projection lens 11.

Further, between light integrator 9a and spatial light modulation element 10a, condenser lens 12a, mirror 13c, and TIR prism (total internal reflection prism) 14 are arranged, and configured to guide the rectangular light flux formed by light integrator 9a to spatial light modulation element 10a.

In the shown example, cross dichroic prism 5 is employed for optical function reflector 4, DMD (digital micromirror device) 15 is employed for spatial light modulation element 10a, and a pair of fly-eye lenses 16a and 16b is employed for light integrator 9a. However, a configuration where a dichroic prism or a dichroic mirror is employed for optical function reflector 4, a configuration where a liquid crystal panel is employed for spatial light modulation element 10a, and a configuration where a rod-lens type integrator including a transparent medium rectangular in section or a light tunnel is employed for light integrator 9a have also been offered.

Projection image display device 1a according to the exemplary embodiment includes diffusion plate 20a on an optical path from a place where excitation laser light 17a and light source laser light 17b are synthesized to a place where the synthesized light enters into cross dichroic prism 5. In other words, diffusion plate 20a is located between dichroic mirror 13b and cross dichroic prism 5. Further, projection image display device 1a includes diffusion plate 20b between collimator lens 3c and cross dichroic prism 5 on the optical path of light source laser light 17c. Vibration motor 22a is connected to diffusion plates 20a and 20b via leaf spring 21a. Specifically, vibration motor 22a is attached to one end of leaf spring 21a at a position near the optical path, and diffusion plates 20a and 20b arranged on the optical path are connected to the other end of leaf spring 21a.

Next, referring to FIG. 5b, the basic operation of projection image display device 1a will be described. Laser lights 17a to 17c radiated from laser light sources 2a to 2c corresponding to the three primary colors of red, green, and blue pass through collimator lenses 3a to 3c to increase beam diameters, and are converted into parallel lights. Laser light 17a is reflected on reflection mirror 13a, and transmitted through dichroic mirror 13b to enter into cross dichroic prism 5. Laser light 17b is reflected on dichroic mirror 13b to enter into cross dichroic prism 5. Laser light 17c directly enters into cross dichroic prism 5.

Among the laser lights entered into cross dichroic prism 5, the laser lights of colors (in this example, light source laser lights 17b and 17c) that are directly used as light sources are reflected on a reflection film in cross dichroic prism 5, and output in a direction (right direction in the drawing) different from incident direction light source laser lights 17b and 17c into cross dichroic prism 5. On the other hand, the laser light (in this example, excitation laser light 17a) used for exciting the phosphor is similarly reflected on the reflection film in cross dichroic prism 5, and output toward circular substrate 7 coated with phosphor 6. The difference in output direction between light source laser lights 17b and 17c and excitation laser light 17a depends on the difference between the positions of laser light sources 2a to 2c, the difference between the wavelengths of laser lights 17a to 17c, transmission and reflection characteristics of cross dichroic prism 5 with respect to the wavelengths, or the like.

Phosphor 6 applied on circular substrate 7 rotated by wheel motor 8 is excited when irradiated with laser light (excitation laser light) 17a to emit fluorescent light 18. Fluorescent light 8 enters again into cross dichroic prism 5. Fluorescent light 18 is synthesized with other laser lights (light source laser light) 17b and 17c, and output to a side opposite circular substrate 7 from cross dichroic prism 5. Then, the synthesized light is entered into the pair of fly-eye lenses 16a and 16b to be converted into a rectangular light flux having a uniform illuminance distribution. The rectangular light flux is applied to DMD 15 via condenser lens 12a, mirror 13c, and TIR prism 14. The rectangular light flux is subjected to light modulation at DMD 15 according to an image signal, and then transmitted again though TIR prism 14 to enter into projection lens 11. The rectangular light flux is enlarged to be transmitted to the screen not shown from projection lens 11.

In such an image display operation, in the exemplary embodiment, vibration motor 22a is activated. Leaf spring 21a is vibrated by solid propagation vibration according to its rotational speed of vibration motor 22a. At this time, diffusion plates 20a and 20b connected to leaf spring 21a receive solid propagation vibration from vibration motor 22a which causes diffusion plate 20a and 20b to swing. Accordingly, the speckle patterns of light source laser light 17b that passed through vibrated diffusion plate 20a and light source laser light 17c that passed through vibrated diffusion plate 20b are superimposed multiple times and integrated. As a result, the speckles of the projected light are averaged, and speckle noise can be reduced.

Simultaneously, gaussian distribution of light intensity of excitation laser light 17a is softened by diffusion plate 20a, and uniform energy density is achieved. Then, excitation laser light 17a is radiated to phosphor 6 applied on circular substrate 7 rotated by wheel motor 8. Thus, the excitation laser light for exciting fluorescent light 18 is applied to phosphor 6 without any locally high energy density. As a result, thermal damage to phosphor 6 can be prevented from occurring.

Further, a resonance frequency determined by the rigidity of lean spring 21a and the mass of diffusion plates 20a and 20b is set beforehand to match the solid propagation vibration frequency of vibration motor 22a. This enables vibration of diffusion plates 20a and 20b at the response point of resonance. Thus, by setting the amplitude of the vibrations of diffusion plates 20a and 20b to a maximum, the displacement amount (dependent on amplitude of diffusion plate) of speckle patterns combined on the retina can be set equal to or larger than the average size of the speckle patterns, and speckle noise can be reduced more effectively.

As in the case of the exemplary embodiment, by employing a configuration where diffusion plate 20a is arranged on the optical path of the synthesized light of excitation laser light 17a and light source laser light 17b to be moved, reduction of the speckle noise of light source laser light 17b and prevention of thermal damage to phosphor 6 by the uniform energy density distribution of excitation laser light 17a can be easily achieved simultaneously via a common member (single diffusion plate 20a).

In this case, since different improvement effects are provided to the individual laser lights (excitation laser light 17a and light source laser light 17b) by using the common member (diffusion plate 20a), the projection image display device can be applied to a compact optical engine, and is suitable for a compact optical engine.

Next, projection image display device according to the second exemplary embodiment of the present invention will be described. Description of components similar to those of the first exemplary embodiment will be omitted.

Figure 6A:
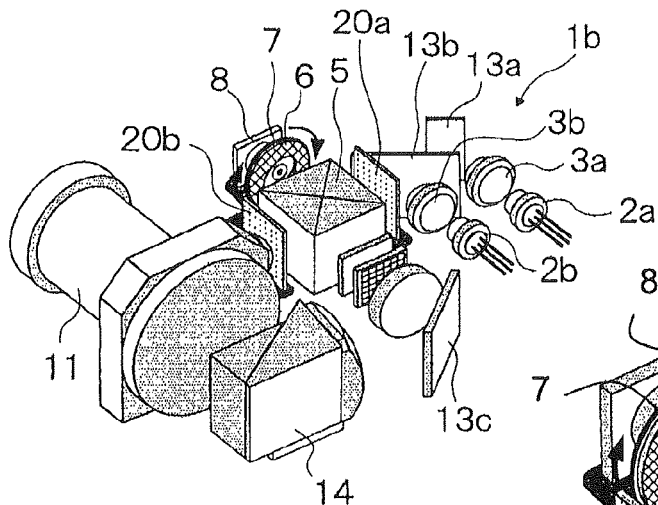
FIG. 6a is a perspective view showing a projection image display device according to the second exemplary embodiment of the present invention.
Figure 6B:
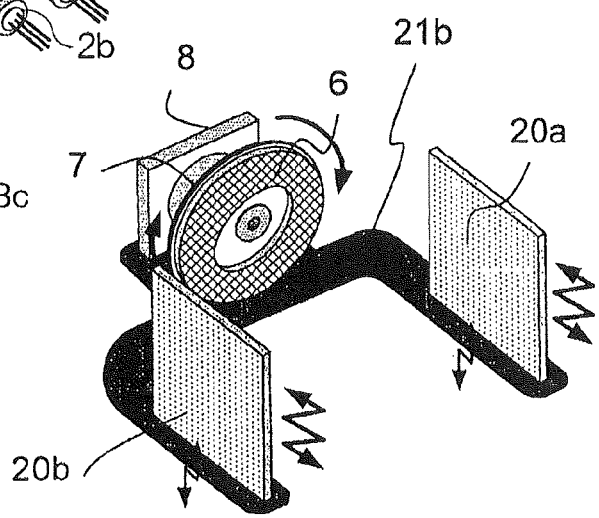
FIG. 6b is an expanded perspective view showing the main portion thereof.
Figure 6C:
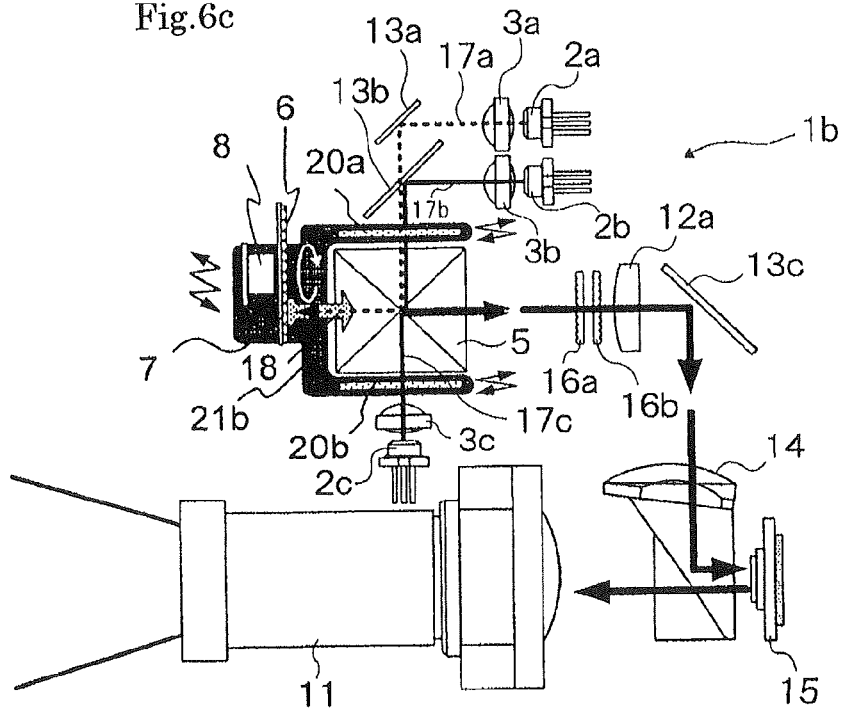
FIG. 6c is a schematic upper view thereof.

FIGS. 6a-6c are schematic views showing projection image display device 1b according to the second exemplary embodiment of the present invention: FIG. 6a being a schematic perspective view, FIG. 6b being an expanded perspective view showing the main portion thereof, and FIG. 6c being a schematic upper view. Projection image display device 1b according to the second exemplary embodiment shown in FIGS. 6a-6c is configured by mounting circular substrate 7 coated with phosphor 6 and wheel motor 8 on leaf spring 21b, and uses wheel motor 8 as an oscillation source for swinging diffusion plates 20a and 20b. Other components are similar to those of projection image display device 1a of the first exemplary embodiment.

According to the exemplary embodiment, diffusion plates 20a and 20b can be swung by using the kinetic energy of wheel motor 8 for rotating phosphor 6 during the image displaying operation. Thus, no additional power is necessary for driving diffusion plates 20a and 20b, nor is noise increased. The speckle noise of light source laser lights 17b and 17c can be effectively removed. As in the case of the first exemplary embodiment, since the uniform energy density distribution of excitation laser light 17a can be simultaneously achieved by diffusion plate 20a, phosphor 6 can be simultaneously prevented from being thermally damaged.

According to the exemplary embodiment, only by connecting wheel motor 8, that is an existing component, to diffusion plates 20a and 20b via simple leaf spring 21b, can the function for reducing speckle noise and the function for preventing thermal damage to phosphor 6 be simultaneously achieved at lower costs, less power, quieter sound, and less space.

Next, a projection image display device according to the third exemplary embodiment of the present invention will be described. Description of components similar to those of the first and second exemplary embodiments will be omitted.

Figure 7A:
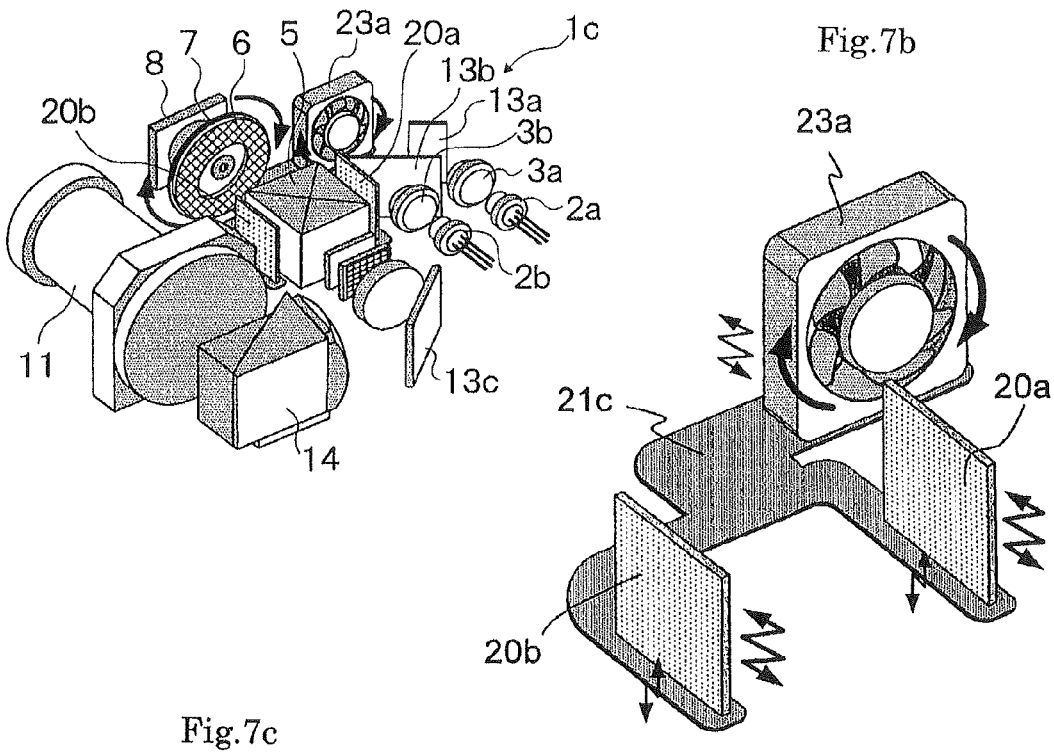
FIG. 7a is a perspective view showing a projection image display device according to the third exemplary embodiment of the present invention.
Figure 7B:
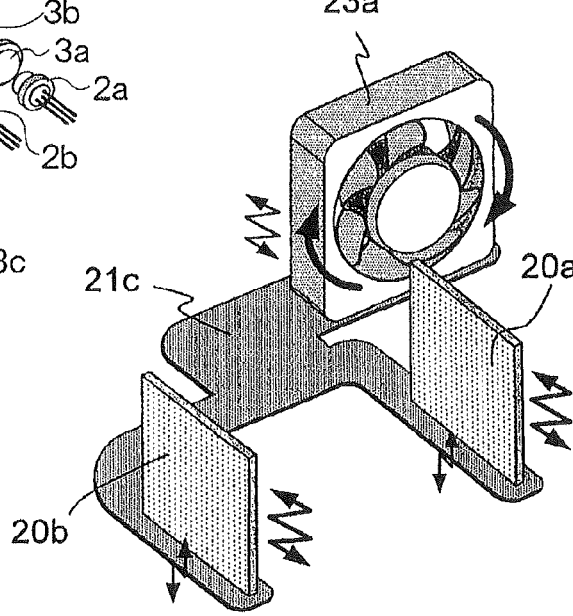
FIG. 7b is an expanded perspective view showing the main portion thereof.
Figure 7C:
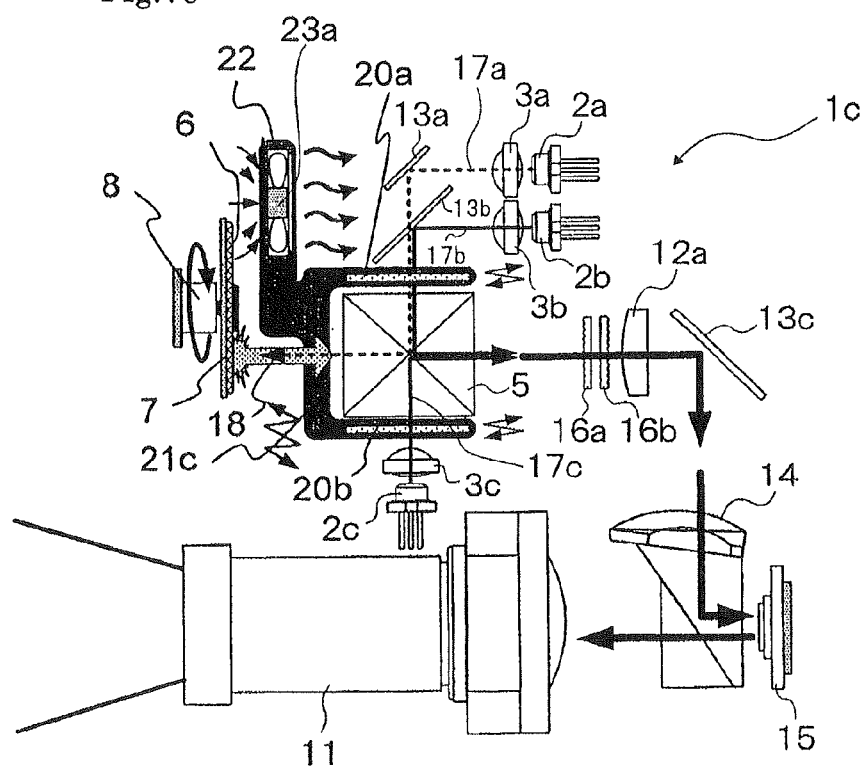
FIG. 7c is a schematic upper view thereof.

FIGS. 7a-7c are schematic views showing projection image display device 1c according to the third exemplary embodiment of the present invention: FIG. 7a being a schematic perspective view, FIG. 7b being an expanded perspective view showing the main portion thereof, and FIG. 7c being a schematic upper view.

Projection image display device 1c according to the third exemplary embodiment shown in FIGS. 7a-7c is configured by mounting air-cooling fan 23a for cooling on leaf spring 21c, and uses air-cooling fan 23a as an oscillation source for swinging diffusion plates 20a and 20b. Other components are similar to those of projection image display device 1a of the first exemplary embodiment.

Generally, laser light sources (semiconductor lasers) 2a to 2c for oscillating laser lights 17a to 17c generate heat during operations. As characteristics of the semiconductor laser, an excessively high-temperature operation causes adverse effects of (1) deterioration of element life, (2) reduction of light output, and (3) shifting of oscillation wavelength. Accordingly, when a high-output semiconductor laser is used, certain cooling work is necessary during the operation. Though not shown in FIGS. 5a-6c, in the related arts and in the first and second exemplary embodiments, it is desirable to use an air-cooling fan for cooling laser light sources 2a to 2c or for ventilating air.

In the exemplary embodiment, air-cooling fan 23a is connected to one end of leaf spring 21c, leaf spring 21c is vibrated by solid propagation vibrations according to the rotational speed of air-cooling fan 23a, and diffusion plates 20a and 20b connected to the other end of leaf spring 21c are swung. According to the exemplary embodiment, diffusion plates 20a and 20b can also be swung by using the kinetic energy of air-cooling fan 23a that is provided for internal cooling (in-case ventilation or laser element cooling). Thus, a function for reducing speckle noise and a function for preventing thermal damage to phosphor 6 be simultaneously achieved at lower costs, less power, quieter sound, and less space.

Next, a projection image display device according to the fourth exemplary embodiment of the present invention will be described. Description of components similar to those of the first to third exemplary embodiments will be omitted.

Figure 8A:
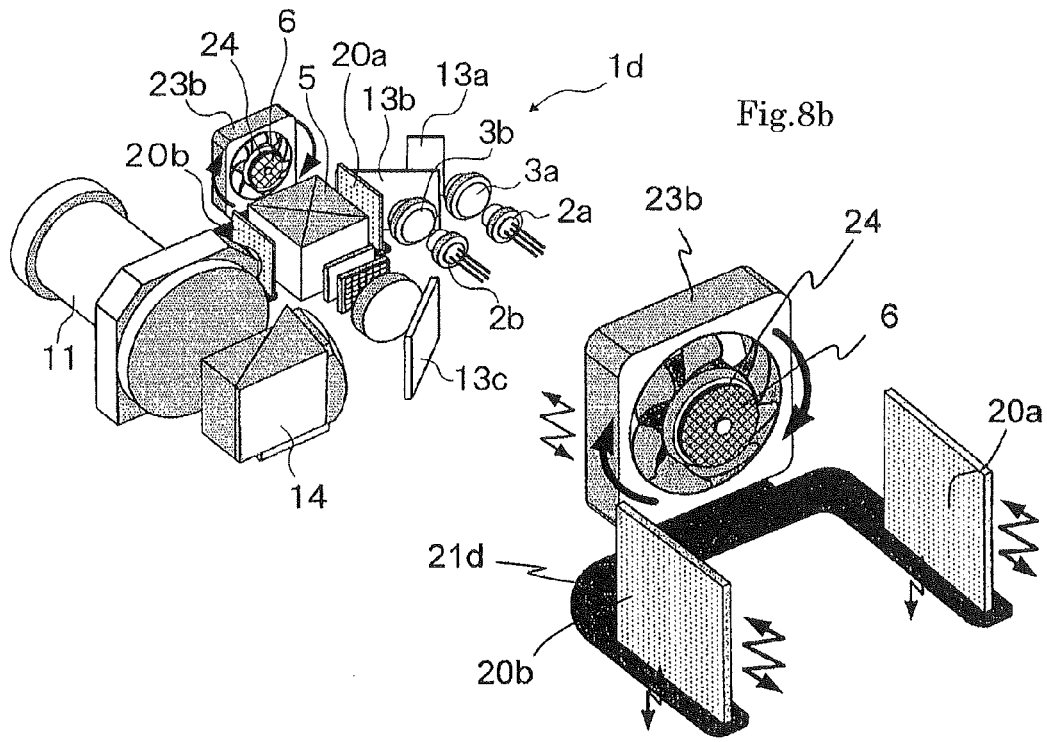
FIG. 8a is a perspective view showing a projection image display device according to the fourth exemplary embodiment of the present invention.
Figure 8B:
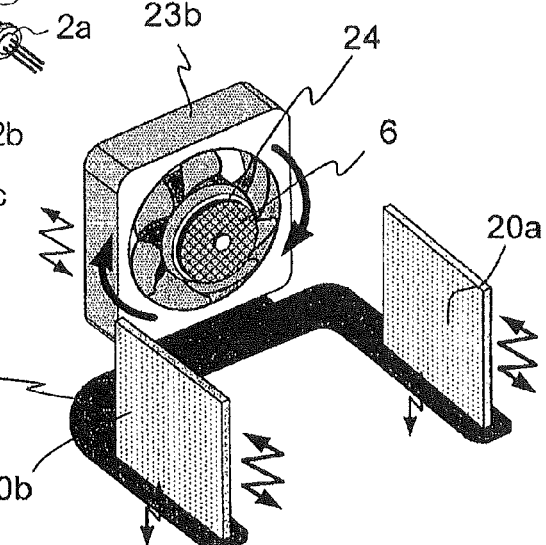
FIG. 8b is an expanded perspective view showing the main portion thereof.
Figure 8C:
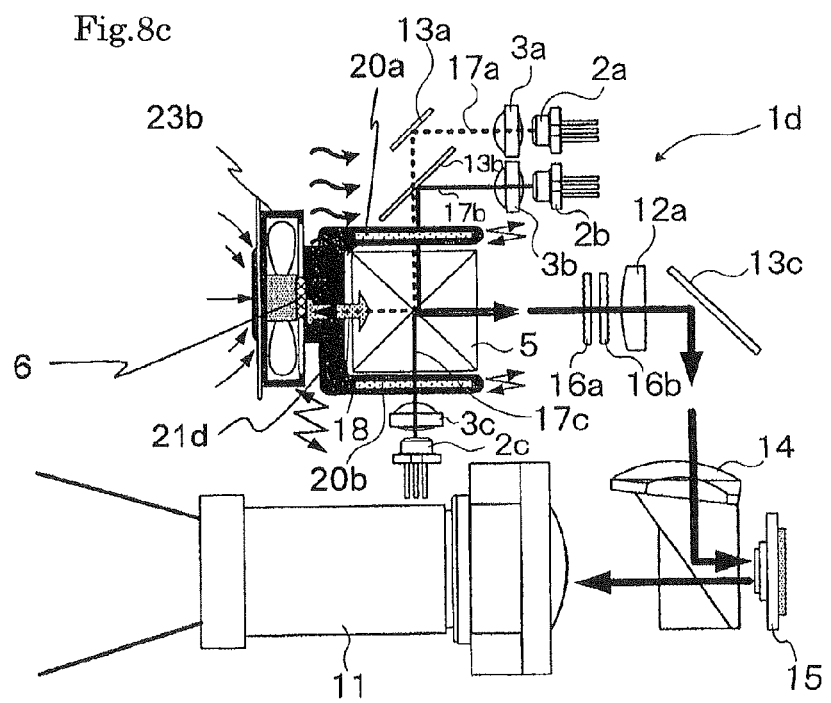
FIG. 8c is a schematic upper view thereof.

FIGS. 8a-8c are schematic views showing projection image display device according to the fourth exemplary embodiment of the present invention: FIG. 8a being a schematic perspective view, FIG. 8b being an expanded perspective view showing the main portion thereof, and FIG. 8c being a schematic upper view.

In projection image display device 1d according to the fourth exemplary embodiment shown in FIGS. 8a-8c, air-cooling fan 23b for cooling is mounted on leaf spring 21c, and circular substrate 7 coated with phosphor 6 is fixed to hub surface 24 of the rotary shaft of air-cooling fan 23b by means such as adhesives. Air-cooling fan 23b with circular substrate 7 coated with phosphor 6 is concurrently used for florescent light generation, for internal cooling, and as an oscillation source for a diffusion plate. With this configuration, as compared with the third exemplary embodiment, a function for reducing speckle noise and a function for preventing thermal damage to phosphor 6 be simultaneously achieved at much lower costs, less power, quieter sound, and less space. Thus, the configuration is more suitably used for a compact optical engine.

In the third and fourth exemplary embodiments shown in FIGS. 7a-8c, axial fans are employed as air-cooling fans 23a and 23b. However, it is obvious that effects similar to the abovementioned effect can be obtained even when sirocco fans are employed as air-cooling fans 23a and 23b.

Next, a projection image display device according to the fifth exemplary embodiment of the present invention will be described. Description of components similar to those of the first to fourth exemplary embodiments will be omitted.

Figure 9:
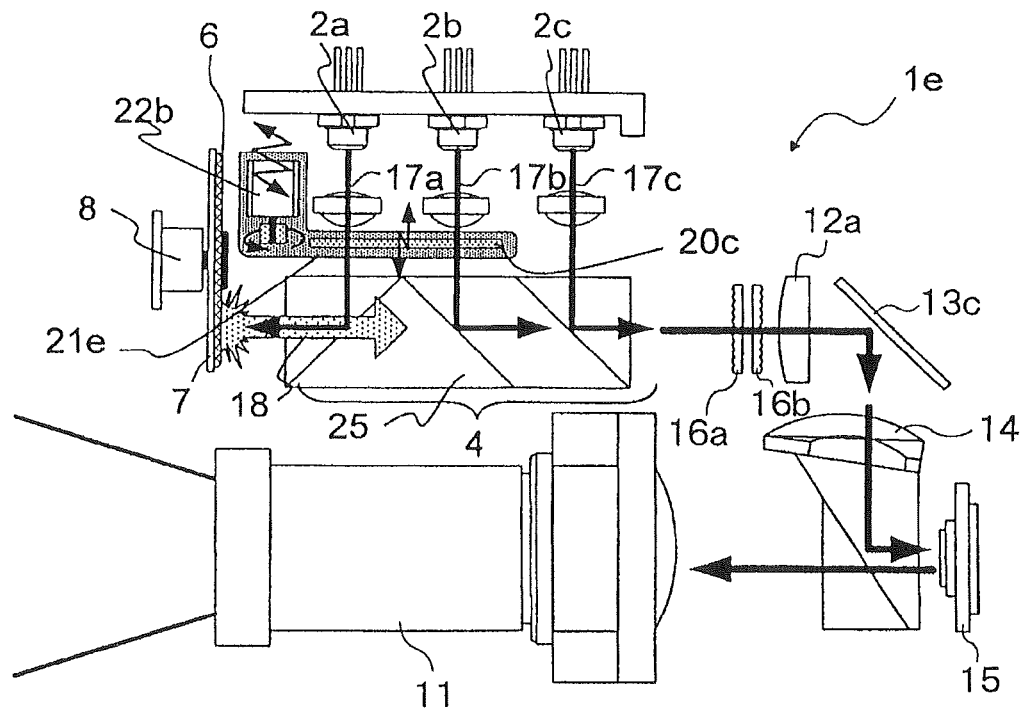
FIG. 9 is a schematic upper view showing a projection display device according to the fifth exemplary embodiment of the present invention.

FIG. 9 is a schematic upper view showing projection image display device 1e according to the fifth exemplary embodiment of the present invention. Different from the first to fourth exemplary embodiments, as shown in FIG. 9, this exemplary embodiment employs a configuration where excitation laser light 17a and light source laser lights 17b and 17c are not synthesized on an optical path before entry into an optical function reflector (dichroic prism), but pass through different optical paths respectively.

In projection image display device 1e according to the fifth exemplary embodiment shown in FIG. 9, laser lights 17a to 17b emitted from laser light sources 2a to 2c corresponding to three primary colors (red, green, and blue) are passed through the different optical paths to enter into dichroic prism 25 (optical function reflector 4). Then, in dichroic prism 25, fluorescent light 18 and light source laser lights 17b and 17c are synthesized to be output, and are guided to fly-eye lenses 16a and 16b (light integrators). At this time, diffusion plate 20c is disposed at a position on the incident side of dichroic prism 25 on the optical path of one laser light having higher visibility among excitation laser light 17a and light source laser lights 17b and 17c.

In the example shown in FIG. 9, diffusion plate 20c is connected to vibration motor 22b via leaf spring 21e, and the solid propagation vibrations that are generated by vibration motor 22b are used as an oscillation source for diffusion plate 20c. However, it is obvious that similar effects can be obtained even when the same oscillation method as that of the second to fourth exemplary embodiment is used.

According to the exemplary embodiment, in an optical engine designed such that the laser lights pass through the different optical paths before the entering dichroic prism 25 (optical function reflector 4), effects similar to those of the first to fourth exemplary embodiments can be obtained.

Next, a projection image display device according to the sixth exemplary embodiment of the present invention will be described. Description of components similar to those of the first to fifth exemplary embodiments will be omitted.

Figure 10:
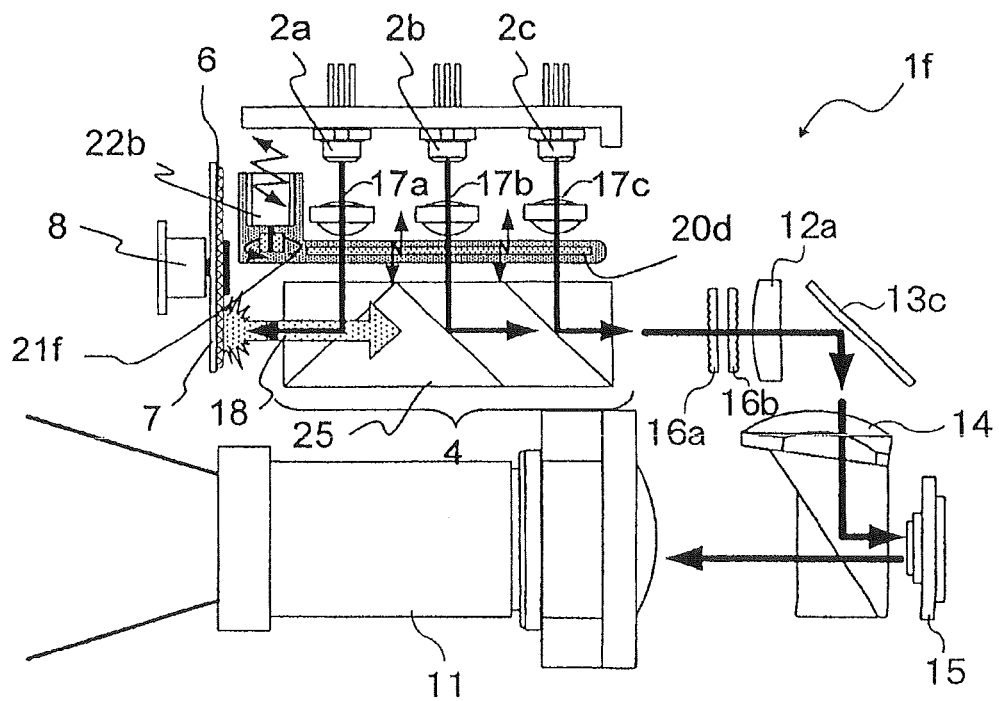
FIG. 10 is a schematic upper view showing a projection display device according to the sixth exemplary embodiment of the present invention.

FIG. 10 is a schematic upper view showing projection image display device 1f according to the sixth exemplary embodiment of the present invention. As in the case of the fifth exemplary embodiment, this exemplary embodiment employs a configuration where excitation laser light 17a and light source laser lights 17b and 17c are not synthesized on an optical path before entry into an optical function reflector (dichroic prism), but pass through different optical paths respectively.

In projection image display device 1f according to the sixth exemplary embodiment shown in FIG. 10, diffusion plate 20d is disposed on the incident side of dichroic prism 25 to overlap the optical paths of all laser lights 17a to 17c. In the exemplary embodiment, diffusion plate 20d is connected to vibration motor 22c via leaf spring 21f, and the solid propagation vibrations that are generated by vibration motor 22c are used as an oscillation source for diffusion plate 20c. However, it is obvious that similar effects can be obtained even when the same oscillation method as that of the second to fourth exemplary embodiment is used. According to the exemplary embodiment, in an optical engine designed such that the laser lights pass through the different optical paths before entering into dichroic prism 25 (optical function reflector 4), effects similar to those of the first to fourth exemplary embodiments can be obtained.

However, according to the exemplary embodiment, the light use efficiency of each optical path is reduced by an amount equal to the light transmittance of diffusion plate 20d. Thus, the exemplary embodiment is applied to a case where the light outputs of laser light sources 2a to 2c have greater margins as compared with the abovementioned fifth exemplary embodiment. Speckle reduction effects are provided by swinging diffusion plate 20d for both light source lasers 17b and 17c. Thus, an advantage can be provided in which the projection image will have reduced speckle noise.

Though not shown, the projection image display device can employ a configuration where diffusion plates are respectively arranged on the optical path of the excitation laser light before the light enters the optical function reflector and on the optical path of the light source laser light before the light enters the optical function reflector (e.g., cross dichroic prism or dichroic prism), the diffusion plates are connected to the different leaf springs, and each leaf spring is connected to diffusion plate driving means (e.g., vibration motor). In this case, it is desirable that the solid propagation frequency of the diffusion plate driving means match the natural frequency of at least one of the leaf springs that are used to hold the plurality of diffusion plates.

As described above, according to the present invention, excitation laser light 17a used for exciting phosphor 6 has its gaussian distribution of light intensity softened by diffusion plates 20a to 20d, and is made uniform within a beam to reduce a local increase of energy density. Thus, thermal damage to phosphor 6 can be easily prevented from occurring. Further, the speckle noise of laser lights (light source laser lights 17b and 17c) other than excitation laser light 17a can be reduced by the movement of diffusion plates 20a to 20d. Since the movement of diffusion plates 20a to 20d can be performed by using a compact and simple configuration and without increasing costs, power consumption, or noise, high-quality projection image displaying is achieved.

EXPLANATION OF REFERENCE NUMERALS 1a-1f Projection image display device
2, 2a, 2b, 2c Laser light source
3, 3a, 3b, 3c Collimator lens
4 Optical functional reflector
5 Cross dichroic prism
6 Phosphor
7 Circular substrate
8 Wheel motor
10a Spatial light modulation element
15 DMD (digital micromirror device)
17a Excitation laser light
17b, 17c Light source laser light
18 Fluorescent light
20a-20d Diffusion plate
21a-21f Leaf spring
22a-22c Vibration motor
23a, 23b Air-cooling fan
25 Dichroic prism

What is claimed is:

1. A projection image display device comprising:
a laser light source;
a phosphor excited by excitation laser light emitted from at least one laser light source to emit light;
a reflector into which at least one of laser light from the laser light sources and fluorescent light from the phosphor enters and which reflects light of a specific wavelength band while transmitting light of the other wavelength band;
a plurality of diffusion plates that diffuse the laser light;
at least one diffusion plate driver which moves the diffusion plates; and
a spatial light modulation element that modulates the light output from the reflector,
the diffusion plates being disposed on an optical path of the excitation laser light applied from the laser light source to the phosphor, wherein
the excitation laser light applied to the phosphor from at least one of the laser light sources and light source laser light from the laser light source other than said laser light source pass through different optical paths before entering the reflector; and
the diffusion plates are respectively arranged on the optical path of the excitation laser light before entering the reflector and on the optical path of the light source laser light before entering the reflector.

2. The projection image display device according to claim 1, further comprising: a circular substrate coated or mixed with the phosphor to be excited by the excitation laser light to emit fluorescent light of a desired color; and a wheel motor for driving the circular substrate to rotate.

3. The projection image display device according to claim 1, further comprising:
a circular substrate coated or mixed with the phosphor to be excited by the excitation laser light to emit fluorescent light of a desired color;
a wheel motor for driving the circular substrate to rotate; and
a leaf spring for holding at least one of the diffusion plates,
wherein the at least one diffusion plate driver comprises the wheel motor, and a solid propagation frequency of the wheel motor matches a natural frequency of the leaf spring.

4. The projection image display device according to claim 1, further comprising a leaf spring for holding at least one of the diffusion plates,
wherein the at least one diffusion plate driver comprises a vibration motor, and a solid propagation frequency of the vibration motor matches a natural frequency of the leaf spring.

5. The projection image display device according to claim 1, further comprising a leaf spring for holding at least one of the diffusion plates,
wherein the diffusion plate driver comprises a cooling fan, and a solid propagation frequency of the cooling fan matches a natural frequency of the leaf spring.

6. The projection image display device according to claim 1, wherein:
the diffusion plates are respectively arranged on the optical path of the excitation laser light applied to the phosphor from at least one of the laser light sources before entering the reflector and on the optical path of the light source laser light from the laser light source other than said laser light source before entering the reflector;
the plurality of diffusion plates are respectively connected to different leaf springs; and
each leaf spring is connected to the diffusion plate driver.

7. The projection image display device according to claim 6, wherein a solid propagation frequency of the diffusion plate driver matches a natural frequency of at least one of the leaf springs for holding the plurality of diffusion plates.

8. The projection image display device according to claim 1, further comprising a light integrator located between the reflector and the spatial light modulation element and configured to form light that passed through the reflector into a rectangular light flux of a uniform illuminance distribution, wherein the light integrator comprises a light tunnel.

9. The projection image display device according to claim 1, wherein the reflector comprises a cross dichroic prism.

10. The projection image display device according to claim 1, wherein the spatial light modulation element comprises a digital micromirror device.

11. A projection image display device, comprising:
a plurality of laser light sources;
a phosphor excited by excitation laser light emitted from at least one laser light source to emit light;
a reflector into which at least one of laser light from the laser light sources and fluorescent light from the phosphor enters and which reflects light of a specific wavelength band while transmitting light of the other wavelength band;
a plurality of diffusion plates that diffuse the laser light;
at least one diffusion plate driver which moves the diffusion plates; and
a spatial light modulation element that modulates the light output from the reflector,
the diffusion plates being disposed on an optical path of the excitation laser light applied from the laser light source to the phosphor, wherein:
the excitation laser light applied to the phosphor from at least one of the laser light sources, and light source laser light from the laser light source other than said laser light source are synthesized on an optical path before entering the reflector; and the diffusion plates are arranged on the optical path of the excitation laser light and the light source laser light that have been synthesized, the diffusion plates are respectively arranged on the optical path of the excitation laser light applied to the phosphor from at least one of the laser light sources before entering the reflector and on the optical path of the light source laser light from the laser light source other than said laser light source before entering the reflector;

the plurality of diffusion plates are respectively connected to different leaf springs; and each leaf spring is connected to the at least one diffusion plate driver.

12. The projection image display device according to claim 1, wherein:

the diffusion plates are respectively arranged on the optical path of the excitation laser light applied to the phosphor from at least one of the laser light sources before entering the reflector and on the optical path of the light source laser light from the laser light source other than said laser light source before entering the reflector;

the plurality of diffusion plates are respectively connected to different leaf springs; and each leaf spring is connected to the at least one diffusion plate driver.

13. The projection image display device according to claim 11, wherein a solid propagation frequency of the at least one diffusion plate driver matches a natural frequency of at least one of the leaf springs for holding the plurality of diffusion plates.

14. The projection image display device according to claim 12, wherein a solid propagation frequency of the at least one diffusion plate driver matches a natural frequency of at least one of the leaf springs for holding the plurality of diffusion plates.

15. A method for displaying an image, comprising:

applying excitation laser light to a phosphor from a laser light source through a diffusion plate which diffuses laser light and which is driven by a diffusion plate driver;

causing at least one of laser light from the laser light source and fluorescent light from the phosphor to enter into a reflector which reflects light of a specific wavelength band while transmitting light of the other wavelength band;

modulating the light output from the reflector; and projecting the modulated light, wherein the diffusion plate is held by a leaf spring, and the diffusion plate driver has a solid propagation frequency which matches a natural frequency of the leaf spring.

* * * * *